Dec. 19, 1950    R. D. HAMILTON    2,534,595
PALM TREE TRUNK TRIMMER
Filed June 30, 1947    2 Sheets-Sheet 1

INVENTOR.
ROBERT D. HAMILTON
BY
Hazard + Miller
Attorneys

Dec. 19, 1950 R. D. HAMILTON 2,534,595
PALM TREE TRUNK TRIMMER
Filed June 30, 1947 2 Sheets-Sheet 2
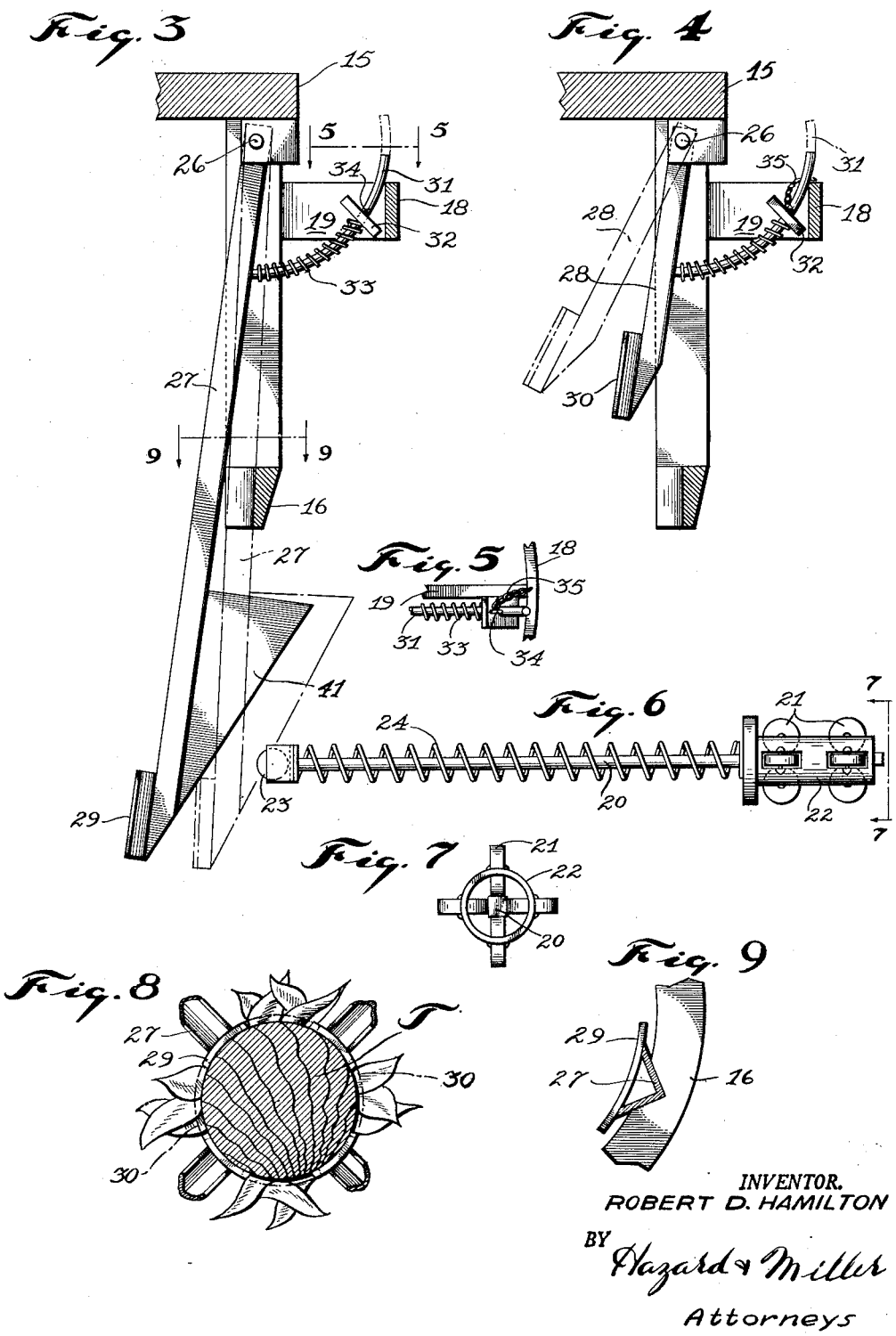
INVENTOR.
ROBERT D. HAMILTON
BY Hazard & Miller
Attorneys Patented Dec. 19, 1950

2,534,595

UNITED STATES PATENT OFFICE 2,534,595

PALM TREE TRUNK TRIMMER

Robert D. Hamilton, Altadena, Calif.

Application June 30, 1947, Serial No. 758,141

15 Claims. (Cl. 47—1)

This invention relates to a method and means of cleaning or stripping the trunks of fan palm trees.

In the course of growth of a fan palm the lower leaves dry and bend downwardly adjacent the sides of the trunk. These leaves should be periodically removed from the trunk. The customary procedure for cleaning or removing these dead and downwardly bent leaves from the trunk of the palm has been to make a plurality of closely spaced circumferential incisions to cut through the strong, tough fibers that connect the stem or petiole to the trunk, thus enabling detachment. Such a method of cleaning the trunk of its dead leaves is quite time-consuming and very laborious in that the horizontal cuts made about the trunk must be closely spaced to cut through the various fibers of the stems. These stems are very closely spaced to one another, being usually partially overlapping and are somewhat staggered in relation.

A primary object of the present invention is to provide an improved method and apparatus that will greatly facilitate the removal of these leaves from the trunk of a fan palm and consisting essentially of a relatively heavy openable cylindrical body that can be applied in encircling relationship about the trunk and which carries a plurality of downwardly directed blades that are urged to swing inwardly against the sides of the trunk. This body, after having been applied to the trunk, may then be consecutively raised and dropped so that the blades are driven downwardly against the tops of the stems or petioles with considerable force. These blades, although they may present relatively dull or blunt edges, will knock or tear off the bases of the stems from the trunk even though there is a relatively strong tough fibrous connection between the stems and the trunk. In this manner, by consecutively raising and dropping the body a group of the leaves may be removed from the trunk on each descent or drop, with the result that a relatively tall fan palm having a trunk completely clothed with dead leaves can be quickly cleaned with a minimum expense of time and labor.

With the foregoing and other objects in view, which will be made manifest in the following detailed description and specifically pointed out in the appended claims, reference is had to the accompanying drawings for an illustrative embodiment of the invention, wherein:

Fig. 3 is a sectional view taken substantially upon the line 3—3 upon Fig. 1;

Fig. 4 is a sectional view taken substantially upon the line 4—4 upon Fig. 1;

Fig. 5 is a horizontal section taken substantially upon the line 5—5 upon Fig. 3;

Fig. 6 is a sectional view taken substantially upon the line 6—6 upon Fig. 1;

Fig. 7 is a view in end elevation that may be regarded as taken upon the line 7—7 upon Fig. 6;

Fig. 8 is a horizontal section taken substantially upon the line 8—8 upon Fig. 2, but illustrating the device in applied position about the trunk of a fan palm; and Fig. 9 is a sectional view taken substantially upon the line 9—9 upon Fig. 3.

Figure 1:
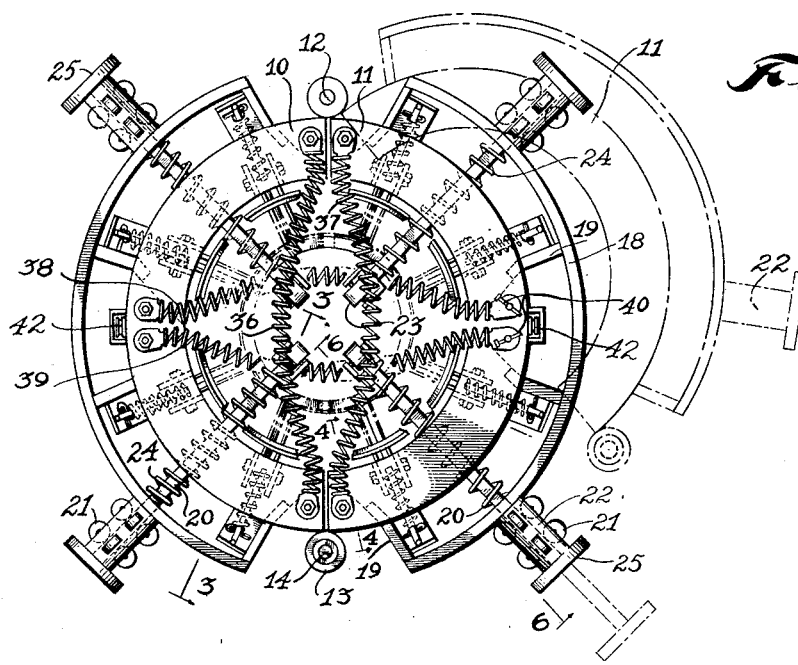
Figure 1 is a top plan view of the apparatus embodying the present invention illustrating in dotted lines the manner in which the body of the apparatus may be opened.
Figure 2:
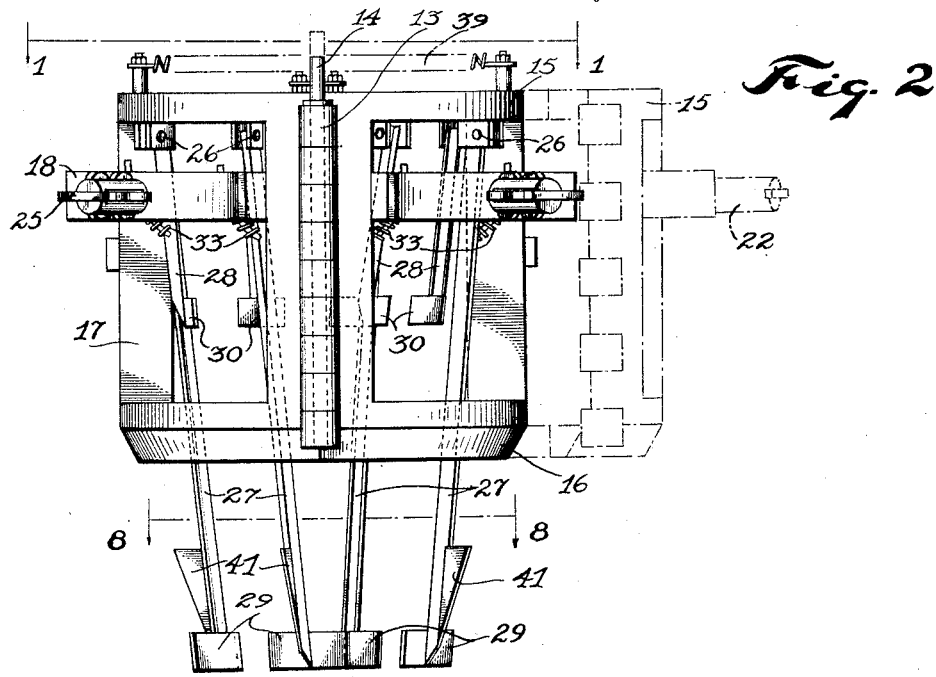
Fig. 2 is a view in side elevation of the same.

Referring to the accompanying drawings wherein similar reference characters designate similar parts throughout, the apparatus illustrated consists essentially of an openable cylindrical body made up of two semi-cylindrical sections indicated at 10 and 11. These sections are hingedly connected together as at 12 and their swinging ends are detachably connected together such as by alignable knuckles 13 adapted to receive a locking pin 14. On removal of this locking pin the two sections 10 and 11 may be swung apart about the hinge 12 as indicated in dotted lines on Fig. 1, to enable the body to be opened and applied about the trunk T of a fan palm. The sections 10 and 11 of the body are preferably very heavily constructed not only to withstand the abuses to which the device may be subjected but to provide adequate weight. Each section is illustrated as being formed in the nature of a framework consisting of top and bottom semi-circular sections 15 and 16, respectively, connected by vertical portions 17. A short distance below the top of each section of the body there is an outer arcuate guide frame 18 that is connected to its respective section of the body such as by arms 19. These guide frames provide guides and bearings for four radially extending squared rods 20 the sides of which roll on rollers 21 that are rotatably mounted on sleeves 22 that are rigid with the guide frames 18. The inner ends of the rods 20 have rollers 23 rotatably mounted thereon and which are adapted to engage the trunk T to assist in centering the body with relation to the trunk. Relatively heavy compression springs 24 are disposed about the rods 20 and are compressed between the mountings for the rollers 23 and the frame 18 and serve to urge the rods 20 inwardly toward the vertical axis through the body. This inward movement is limited by means of heads 25 on the rods which engage the outer ends of the sleeves 22 that rotatably mount the rollers 21. As the rods 20 are square in cross section they may freely slide radially between the rollers 21 but cannot rotate between these rollers. Consequently the rollers 23 are always maintained in a position for rolling movement up and down the trunk. As the compression of the springs 24 is equal, or substantially so, the body of the device is thus held in concentric relation to the trunk.

At spaced intervals around the upper circular sections 15 there are pivotal mountings 26 that pivotally suspend downwardly extending arms 27 and 28. The arms 27 are longer than the arms 28 and both sets of arms are preferably formed of angle iron for purposes of stiffness. The longer arms 27 have arcuate blades 29 secured to their lower ends. These blades need not be sharpened and usually present dull or blunt bottom edges. The blades 30 that are secured to the shorter arms 28 are likewise arcuate in plan and present dull or blunt bottom edges. As the short arms 28 are arranged intermediate the longer arms 27, the upper blades 30 carried thereby will be arranged in staggered relation to the lower blades 29. In this manner, during the descent of the device around the trunk, the blades 29 will traverse circumferentially spaced vertical paths and the upper blades 30 will likewise traverse circumferentially spaced vertical paths which are intermediate the paths traversed by the blades 29. Consequently those stems or petioles which are not removed from the trunk by the blades 29 will be subsequently removed by the blades 30.

Each of the arms 27 and 28 carries a curved or quadrant-shaped arm 31 that slidably extends through an ear 32 on a bracket secured to the guide frame 18. The center of curvature of each arm 31 is coincident with the axis of swinging movement of the arm 27 or 28 as the case may be. Coil compression springs 33 are disposed about the arcuate arms 31 and are compressed between the arms 27 or 28, as the case may be, and the lugs 32. These coil compression springs urge the arms inwardly or into engagement with the sides of the trunk. They may be locked in their outermost positions by means of a pin 34 receivable through a diameteric aperture and attached to the guide frame 18 such as by a chain 35. It is desirable to lock the arms 27 and 28 in their outermost positions while the device is being applied around the trunk T and, after having been thus applied, to release these arms by the withdrawal of the pins.

Across the top of the body there are two pairs of helically coiled springs, one pair being indicated at 36 and 37. The springs of this pair have their rear ends secured to the body on opposite sides of the hinge 12 and their forward ends secured to the body on opposite sides of the knuckles 13. The springs of this pair will thus open or separate from each other on opening the body and consequently they may be permanently secured to their respective sections 10 and 11. The other springs 38 and 39 each have one end permanently secured to the section 10 but their opposite ends are detachably secured to the section 11 such as by pins 40. In opening and applying the body around the tree trunk, both of the pins 40 may be removed to detach the springs from the section 11 to permit that section to be swung open. When the body is closed around the tree trunk the pins 40 are re-applied to lock the springs 38 and 39 to the section 11 as illustrated.

The four springs 36, 37, 38 and 39 approach being diametrical springs and are stretched when the body is in applied position. These springs thus rub on the tree trunk during the descent of the body after the blades 29 and 30 have traversed the trunk. The function of these springs is to wipe or rub off loose fibers that may be left on the trunk after the leaf stems have been knocked off by the blades. I find it very advantageous to provide upwardly and outwardly extending ribs or fins 41 on the backs of the arms 27 immediately above the blades 29. The outwardly and upwardly inclined edges presented by these ribs serve to pry the stems away from the tree trunk after the blades 29 have loosened them.

The operation of the above described apparatus is substantially as follows: In applying the device to a tree trunk it is frequently necessary to remove a few of the palm leaves at the top by hand, that is, by cutting through the bases of the stems with a knife and bodily removing such leaves to thus provide a clear space at the top of the trunk around which the body may be applied. The pins 40 are then removed to detach springs 38 and 39 from the section 11. The arms 27 and 28 are swung outwardly and are locked in their outermost positions by means of pins 34. The rods 20 are also locked in outer positions such as by applying small spacer blocks (not shown) between the heads 25 and the outer ends of the sleeves 22. With the rods 20 and arms 27 and 28 thus locked in outermost positions the body may be positioned around the tree trunk and the sections 10 and 11 swung together and locked in encircling position by means of the locking pin 14. The springs 38 and 39 are again attached to the section 11 and the pins 34 are withdrawn to allow the springs 33 to become effective to urge the arms 27 and 28 inwardly. The body may then be elevated to the uppermost position on the trunk and allowed to drop. As a means for elevating the body, connections 42 are provided on opposite sides of the body for the attachment of a bridle (not shown). During the first drop of the body the blocks used to lock the rods 20 in their outermost positions will usually be jarred or caused to drop out thus releasing the rods 20. However, if desired these blocks may be manually removed prior to the first drop. During the dropping the blades 29 and 30 consecutively encounter the bases of the stems and either knock or tear these stems loose from the trunk. However, as the stems are rather tenaciously attached to the trunk the downward dropping of the apparatus is shortly arrested and the body is then again lifted and again dropped. This procedure is continued until all of the stems have been removed from the tree trunk after which the device is removed from the trunk and applied to the trunk of an adjoining tree.

During the consecutive drops of the apparatus it is effectively held centered with relation to the tree trunk by the inwardly urged rods 20 and the springs 36, 37, 38 and 39. This may be somewhat supplemented by the inwardly urged arms 27 and 28 although usually the springs which actuate these arms are weak enough so that any bulge upon the tree trunk will throw the blades outwardly thus avoiding injury to the tree. Those stems which are not knocked loose and torn off by the blades 29 will be removed by means of the followup blades 30. The springs 36, 37, 38 and 39 which rub on the trunk during the successive raising and dropping of the device tend to catch and tear off or rub off any loose fiber to thus smooth and clean the tree.

It will be appreciated that the improved device greatly facilitates the cleaning of palm tree trunks. Any suitable mechanism may be employed for raising and dropping the body. I find it advantageous to construct the body so that its approximate weight is in the neighborhood of 350 to 650 pounds so that when it is dropped an adequate force will be present to cause the blades 29 and 30 to knock off the stems of the leaves.

Various changes may be made in the details of the construction without departing from the spirit and scope of the invention as defined by the appended claims.

I claim:

1. A fan palm tree trimmer comprising an openable generally cylindrical body adapted to be placed in encircling position about a palm tree trunk, the body comprising sections connectable to one another to be arranged about a palm tree trunk, and a plurality of downwardly directed blades carried thereby.

2. A fan palm tree trimmer comprising an openable generally cylindrical body adapted to be placed in encircling position about a palm tree trunk, the body comprising sections connectable to one another to be arranged about a palm tree trunk, a plurality of downwardly directed blades carried thereby, and means for urging the blades inwardly into engagement with the trunk.

3. A fan palm tree trimmer comprising an openable generally cylindrical body adapted to be placed in encircling position about a palm tree trunk, and a plurality of downwardly directed blades mounted for inward swinging movement relative to the body through radial planes, and spring means urging the blades inwardly relatively to the body.

4. A fan palm tree trimmer comprising an openable generally cylindrical body adapted to be placed in encircling position about a palm tree trunk, means for centering the body with relation to the trunk, and a plurality of downwardly directed blades mounted for inward swinging movement on the body, and means for urging said blades inwardly.

5. A fan palm tree trimmer comprising an openable generally cylindrical body adapted to be placed in encircling position about a palm tree trunk, means for centering the body with relation to the trunk in spaced relation thereto, and a plurality of downwardly directed blades mounted for inward swinging movement on the body, and means for urging said blades inwardly, some of the blades being arranged above the others.

6. A fan palm tree trimmer comprising an openable generally cylindrical body adapted to be placed in encircling position about a palm tree trunk, means for centering the body with relation to the trunk, and a plurality of downwardly directed blades mounted for inward swinging movement on the body, and means for urging said blades inwardly, each blade having a radially arranged upwardly and outwardly sloping rib on the back thereof.

7. A fan palm tree trimmer comprising an openable generally cylindrical body adapted to be placed in encircling position about a palm tree trunk, means for centering the body with relation to the trunk and a plurality of downwardly directed blades mounted for inward swinging movement on the body, and means for urging said blades inwardly, some of the blades being arranged above the others and being in staggered relation to each other.

8. A fan palm tree trimmer comprising an openable generally cylindrical body adapted to be placed in encircling position about a palm tree trunk, means for centering the body with relation to the trunk, and a plurality of downwardly directed blades mounted for inward swinging movement on the body, and means for urging said blades inwardly, and helical springs extending across the body at the top thereof adapted to engage the sides of the trunk after it has been traversed by said blades.

9. A fan palm tree trimmer comprising an openable generally cylindrical body adapted to be placed in encircling position about a palm tree trunk, means for locking the body in encircled position about the trunk, spring-actuated members supported by the body for positioning the body in spaced relation to the palm tree trunk and concentrically therewith, a plurality of downwardly directed blades, each blade being mounted on said body for swinging movement through a radial plane, springs associated with the blades for urging the blades inwardly relative to the body, and springs extending across the body adapted to engage the sides of the trunk.

10. A fan palm tree trimmer comprising a body, the body comprising sections connectable to one another to be arranged about a palm tree trunk, a plurality of downwardly directed blades carried by the body, at least some of the blades being mounted on said body for swinging movement through radial planes, and means urging the blades inwardly toward the palm tree trunk, some of the blades being arranged above the others and being in staggered relation to each other.

11. A fan palm tree trimmer comprising a generally cylindrical frame adapted to be placed in encircling position about a palm tree trunk, the frame being separable into sections, the sections being connected together for swinging movement from an open position to a closed position, means for locking the sections in closed position, and a plurality of downwardly directed blades carried by the frame.

12. A fan palm tree trimmer comprising an openable general cylindrical body adapted to be placed in encircling position about a palm tree trunk, means for centering the body with relation to the trunk, a plurality of downwardly directed blades mounted for swinging movement on the body, means for urging said blades inwardly, some of the blades being arranged above the others and being in staggered relation to each other, and helical springs extending across the body at the top thereof adapted to engage the sides of the trunk after it has been traversed by said blades.

13. A fan palm tree trimmer comprising a body adapted to be placed in an encircling position about a palm tree trunk, and a plurality of downwardly directed blades carried thereby, at least some of the blades having fins thereon, the planes through the fins being generally radial.

14. A fan palm tree trimmer comprising a body adapted to be placed in an encircling position about a palm tree trunk, and a plurality of downwardly directed blades carried thereby, at least some of the blades having fins associated therewith, the fins extending from the blades in an outward and upward direction to urge the cut fronds away from the trunk.

15. A fan palm tree trimmer comprising a body, a plurality of downwardly directed blades carried by the body for cutting fronds from the tree, at least some of the blades having fins arranged adjacent the back thereof and supported by the body, the fins extending outwardly and upwardly from the blades to urge the cut fronds away from the trunk of the palm tree.

ROBERT D. HAMILTON.

REFERENCES CITED

The following references are of record in the file of this patent:

UNITED STATES PATENTS

| Number | Name | Date |
|---|---|---|
| 707,428 | Kidder | Aug. 19, 1902 |
| 1,539,603 | Saprones | May 26, 1925 |
| 1,680,372 | Fenn | Aug. 14, 1928 |
| 2,477,922 | Emery | Aug. 2, 1949 |
| 2,482,392 | Whitaker | Sept. 20, 1949 |

FOREIGN PATENTS

| Number | Country | Date |
|---|---|---|
| 722,254 | France | Dec. 28, 1931 |
| 1,746 | Great Britain | of 1882 |